US008724922B2

(12) United States Patent
Minakawa et al.

(10) Patent No.: US 8,724,922 B2
(45) Date of Patent: *May 13, 2014

(54) IMAGE CORRECTING DEVICE, METHOD FOR CREATING CORRECTED IMAGE, CORRECTION TABLE CREATING DEVICE, METHOD FOR CREATING CORRECTION TABLE, PROGRAM FOR CREATING CORRECTION TABLE, AND PROGRAM FOR CREATING CORRECTED IMAGE

(75) Inventors: Tsuyoshi Minakawa, Kawasaki (JP); Tatsuzo Hamada, Hadano (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 190 days.

This patent is subject to a terminal disclaimer.

(21) Appl. No.: 13/035,567

(22) Filed: Feb. 25, 2011

(65) Prior Publication Data
US 2012/0051661 A1    Mar. 1, 2012

(30) Foreign Application Priority Data

Aug. 31, 2010    (JP) .................................. 2010-194771

(51) Int. Cl.
*G06K 9/40*    (2006.01)
*H04N 7/00*    (2011.01)

(52) U.S. Cl.
USPC .............................. 382/274; 382/254; 348/36

(58) Field of Classification Search
USPC ......... 382/103, 154, 171, 190, 254, 282, 284,
382/285, 294, 295; 358/538, 450, 453;
345/419, 424, 664, 679
See application file for complete search history.

(56) References Cited

U.S. PATENT DOCUMENTS

| 6,115,480 A * | 9/2000 | Washizawa .................... 382/103 |
| 7,570,280 B2 * | 8/2009 | Ozaki .............................. 348/36 |
| 8,189,953 B2 * | 5/2012 | Kamiya et al. ................ 382/275 |

(Continued)

FOREIGN PATENT DOCUMENTS

| CN | 101809993 A | 8/2010 |
| JP | 2001-005956 | 1/2001 |
| JP | 2008-052589 A | 3/2008 |
| JP | 2008-301052 A | 12/2008 |
| JP | 2008-311890 A | 12/2008 |
| JP | 2010-170514 A | 8/2010 |

OTHER PUBLICATIONS

Ying, Xianghua, et al.; Fisheye Lenses Calibration Using Straight-Line Spherical Perspective Projection Constraint; ACCV 2006, LNCS 3852; pp. 61-70.

(Continued)

*Primary Examiner* — Andrae S Allison
(74) *Attorney, Agent, or Firm* — Foley & Lardner LLP

(57) ABSTRACT

An image correcting device includes an image input section, an image storage section, a correction table storage section, a geometry correcting section for geometrically correcting an input image stored in the image storage section, based on a correction table, and an image output section for output of the input image corrected by the geometry correcting section, wherein the correction table is created by calculating longitudes and latitudes that correspond to respective pixel positions on an output image that becomes the corrected image; calculating corrected latitudes through correction of the latitudes, based on the longitudes and the latitudes; calculating light directions in a subject space, the light directions corresponding to the longitudes and the corrected latitudes; and calculating positions on the input image as resampling positions, the positions corresponding to the respective light directions; and associating the resampling positions with the pixel positions on the output image.

7 Claims, 11 Drawing Sheets

(56) References Cited

U.S. PATENT DOCUMENTS

| | | | |
|---|---|---|---|
| 8,363,981 B2* | 1/2013 | Tonomura | 382/293 |
| 2002/0049532 A1* | 4/2002 | Nakamura | 701/208 |
| 2004/0260469 A1 | 12/2004 | Mizusawa | |
| 2005/0265619 A1* | 12/2005 | Ozaki | 382/254 |
| 2010/0053325 A1* | 3/2010 | Inagaki | 348/143 |
| 2010/0208032 A1* | 8/2010 | Kweon | 348/36 |
| 2011/0181689 A1 | 7/2011 | Kweon | |

OTHER PUBLICATIONS

European Patent Office search report on application 11155926.6 dated Jan. 18, 2012; 11 pages.

Yamanaka, Mutsuhiro, et al.; Thin-Profile Intercom Terminal with Built-In Ultra Wide-Angle Lens and Distortion Correction Processing; Panasonic Electric Works Technical Report vol. 57 No. 2; Jun. 2009; pp. 34-39.

* cited by examiner

RESAMPLING TABLE (CORRECTION TABLE)

PIXEL COORDINATE OF OUTPUT IMAGE (u COORDINATE)

| v \ u | 0 | 1 | ... | 639 |
|---|---|---|---|---|
| 0 | (205.0, 386.5) | (207.1, 384.7) | ... | (1075.0, 386.5) |
| 1 | (204.7, 387.3) | (206.8, 385.5) | ... | (1075.0, 387.3) |
| ⋮ | ⋮ | ⋮ | ⋮ COORDINATES OF INPUT IMAGE $(x_m, y_m)$ | ⋮ |
| 479 | (205.0, 677.5) | (207.1, 679.3) | ... | (1075.0, 677.5) |

PIXEL COORDINATE OF OUTPUT IMAGE (v COORDINATE)

FIG. 5A

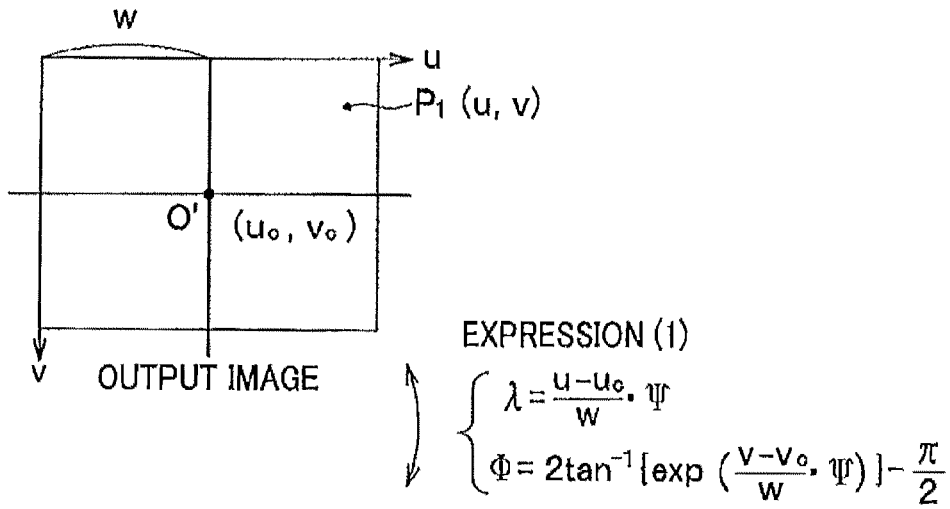

EXPRESSION (1)
$$\begin{cases} \lambda = \frac{u-u_o}{w} \cdot \Psi \\ \Phi = 2\tan^{-1}[\exp(\frac{v-v_o}{w} \cdot \Psi)] - \frac{\pi}{2} \end{cases}$$

FIG. 5B

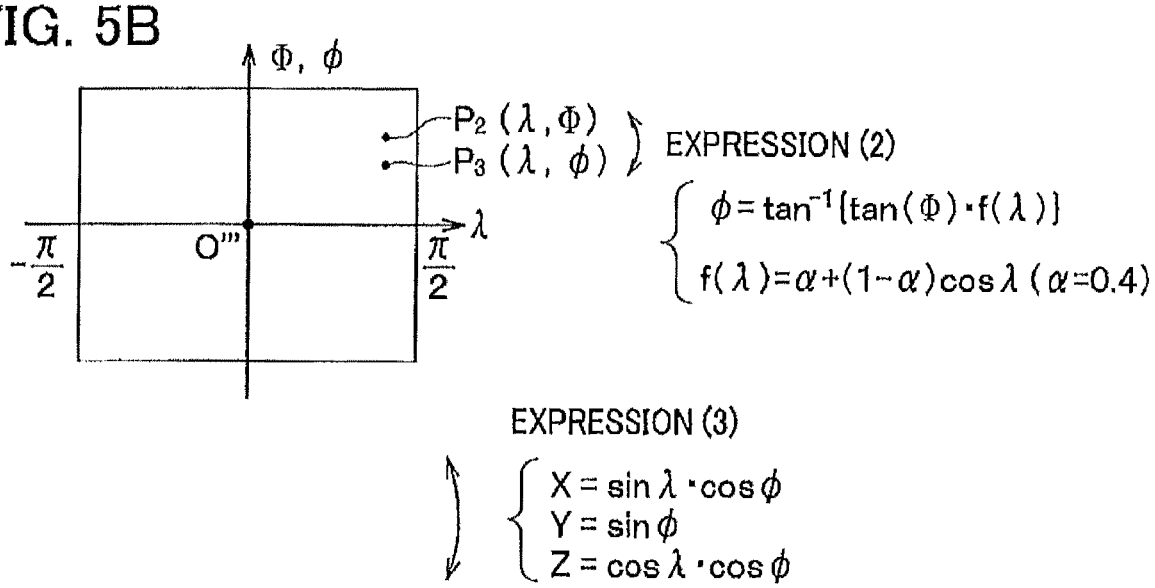

EXPRESSION (2)
$$\begin{cases} \phi = \tan^{-1}[\tan(\Phi) \cdot f(\lambda)] \\ f(\lambda) = \alpha + (1-\alpha)\cos\lambda \quad (\alpha = 0.4) \end{cases}$$

EXPRESSION (3)
$$\begin{cases} X = \sin\lambda \cdot \cos\phi \\ Y = \sin\phi \\ Z = \cos\lambda \cdot \cos\phi \end{cases}$$

FIG. 6A

FIG. 6A
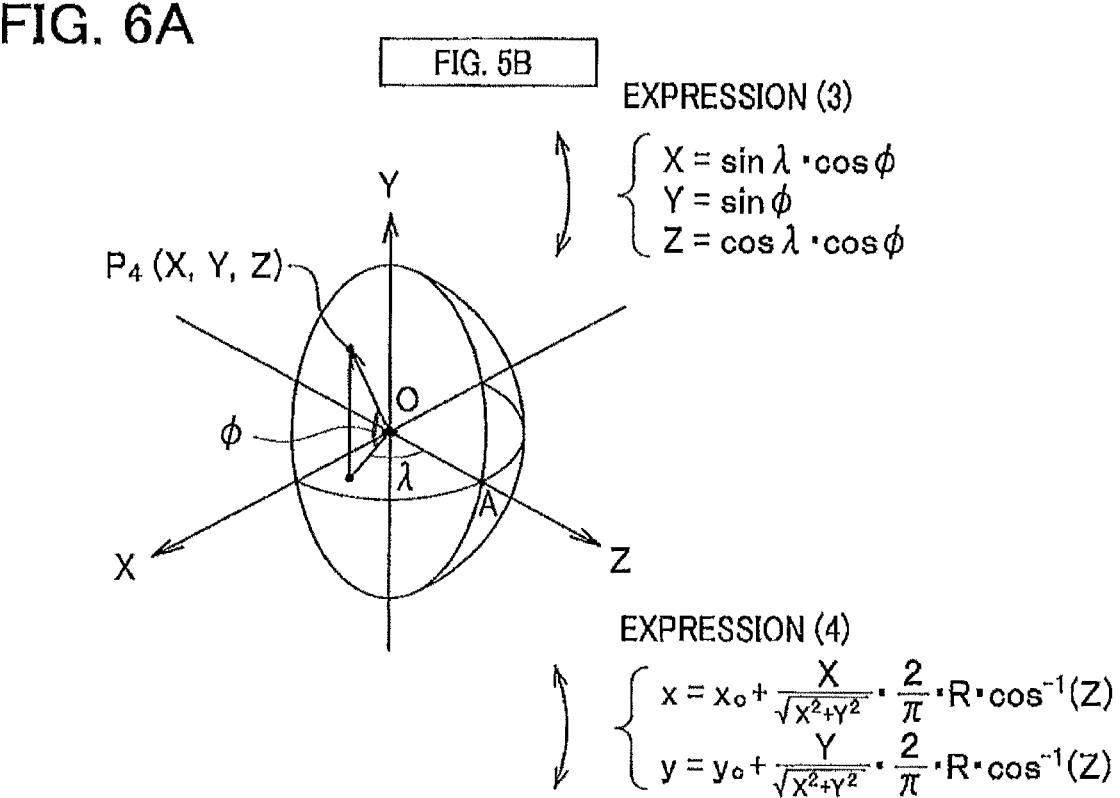
FIG. 5B
EXPRESSION (3)
$$\begin{cases} X = \sin\lambda \cdot \cos\phi \\ Y = \sin\phi \\ Z = \cos\lambda \cdot \cos\phi \end{cases}$$
EXPRESSION (4)
$$\begin{cases} x = x_0 + \dfrac{X}{\sqrt{X^2+Y^2}} \cdot \dfrac{2}{\pi} \cdot R \cdot \cos^{-1}(Z) \\ y = y_0 + \dfrac{Y}{\sqrt{X^2+Y^2}} \cdot \dfrac{2}{\pi} \cdot R \cdot \cos^{-1}(Z) \end{cases}$$
FIG. 6B
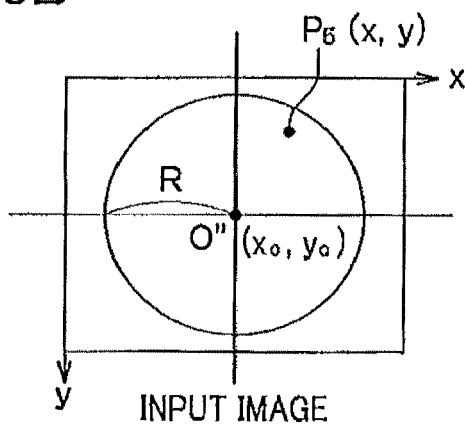
INPUT IMAGE

FISH EYE IMAGE (INPUT IMAGE)

CONVENTIONAL CORRECTED IMAGE
(PERSPECTIVE TRANSFORMATION 160 DEGREES)
(OUTPUT IMAGE)

CONVENTIONAL CORRECTED IMAGE (MERCATOR PROJECTION)
(OUTPUT IMAGE)

CORRECTED IMAGE IN EMBODIMENT
(OUTPUT IMAGE)

IMAGE CORRECTING DEVICE, METHOD FOR CREATING CORRECTED IMAGE, CORRECTION TABLE CREATING DEVICE, METHOD FOR CREATING CORRECTION TABLE, PROGRAM FOR CREATING CORRECTION TABLE, AND PROGRAM FOR CREATING CORRECTED IMAGE

CROSS REFERENCE TO RELATED APPLICATION

The application claims the foreign priority benefit under Title 35, United States Code, Section 119(a)-(d) of Japanese Patent Application No. 2010-194771, filed on Aug. 31, 2010, the contents of which are hereby incorporated by reference.

BACKGROUND

The present invention relates to a technology including an image correcting device configured to create an output image through geometrical correction of an input image.

In recent years, in several application fields including a monitoring camera and video door phone, there is a demand for obtaining images of a wide visual field. As a solution to meet this demand, video cameras with a fisheye lens and the like that obtain images of the range of about 180 degrees in the horizontal angle of view are practically used. However, in an image captured with such a device, in general, a straight line in the space of a subject (for example, a straight line in the real world) is greatly distorted. Thus, there is a demand of performing geometrical correction of the captured image for reduction in the degree of distortion.

For a fisheye lens, depending on the design concept, there are various applicable projection methods including equidistance projection, equisolid angle projection, and orthogonal projection. In any of these projections, as long as the angle of view to be represented by an image having been subjected to correction, in other words, an image after correction, is smaller than 180 degrees, the distortion of a line in an image captured with a fisheye lens (hereinafter, referred to as 'a fisheye image') can be completely corrected by applying perspective transformation, based on a design value/values or a given parameter/parameters estimated by a conventional technology and a projection model.

FIG. 13A shows an example of a fisheye image. Further, FIG. 13B shows an example where this fisheye image has been corrected, applying perspective transformation such that the angle of view in the left/right direction is ensured to be wide. As shown in FIG. 13B, as a result of correction through perspective transformation, although the portions to be linear are corrected to be linear, the marginal portions of the image are extremely expanded with an emphasis on perspective, causing a feeling of strangeness of the image. This is a problem caused by a significant difference between the angle of view represented by the corrected image and the angle of view of viewing that image.

JP 2008-311890 A discloses a technology developed to solve this problem. In the technology disclosed by JP 2008-311890 A, using a cylindrical surface that smoothly connects the front face and the left and right faces, which are substantially planes, correction is performed such that a linear subject extending in the top/bottom direction and a linear subject directing toward the optical axis respectively appear linear while an angle of view exceeding 180 degrees in the left/right direction is ensured.

SUMMARY

However, in the technology disclosed by JP 2008-311890 A, a horizontal line is rapidly distorted in the vicinities of midst between the central portion and the portions near the left and right ends of an output image, causing a problem of a feeling of strangeness, for example, in a case where a subject moves across in front of a camera.

The present specification discloses an image correcting device, a method for creating a corrected image, a correction table creating device, a method for creating a correction table, a program for creating a correction table, and a program for creating a corrected image which reduce or eliminate a feeling of strangeness of an image after correction.

A method is provided that attains, for example, a correction result as shown in FIG. 14 by correcting the fisheye image in FIG. 13A. It is observed that the distortion of the horizon is reduced in FIG. 14, compared with FIG. 13C, which is an example of a correction result of applying Mercator projection as it is, which is a conventional technology.

There is disclosed an image correcting device for creating a corrected image through geometrical correction of an input image, including: an image input section for input of the input image; an image storage section for storage of the input image; a correction table storage section for storage of a correction table to be used for geometrical correction of the input image; a geometrical correcting section for geometrical correction of the input image stored in the image storage section, based on the correction table; and an image output section for output of the input image corrected by the geometrical correction section, as the corrected image, wherein the correction table is created by calculating longitudes and latitudes that correspond to respective pixel positions on an output image that becomes the corrected image; calculating corrected latitudes through correction of the latitudes, based on the longitudes and the latitudes; calculating light directions in a subject space, the light directions corresponding to the longitudes and the corrected latitudes; calculating positions on the input image as resampling positions, the positions corresponding to the light directions; and associating the resampling positions with the pixel positions on the output image.

According to the teaching herein, a feeling of strangeness of an image after correction can be reduced or eliminated.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5A is a diagram for illustrating an example of coordinate system transformation for associating pixel coordinates on an output image with coordinates on an input image and shows an example of a coordinate system of the output image;

FIG. 5B is a diagram for illustrating the example of coordinate system transformation for associating pixel coordinates on the output image with coordinates on the input image and shows an example of a longitude/latitude coordinate system;

FIG. 6A is a diagram for illustrating the example of coordinate system transformation for associating pixel coordinates on the output image with coordinates on the input image and shows an example of a coordinate system for obtaining a light direction vector, based on a longitude and a latitude;

FIG. 6B is a diagram for illustrating the example of coordinate system transformation for associating pixel coordinates on the output image with coordinates on the input image and shows an example of a coordinate system of the input image;

DETAILED DESCRIPTION OF THE EMBODIMENTS

First Embodiment

A first embodiment will be described below, with reference to FIGS. 1 to 10.

Figures 1, 2:
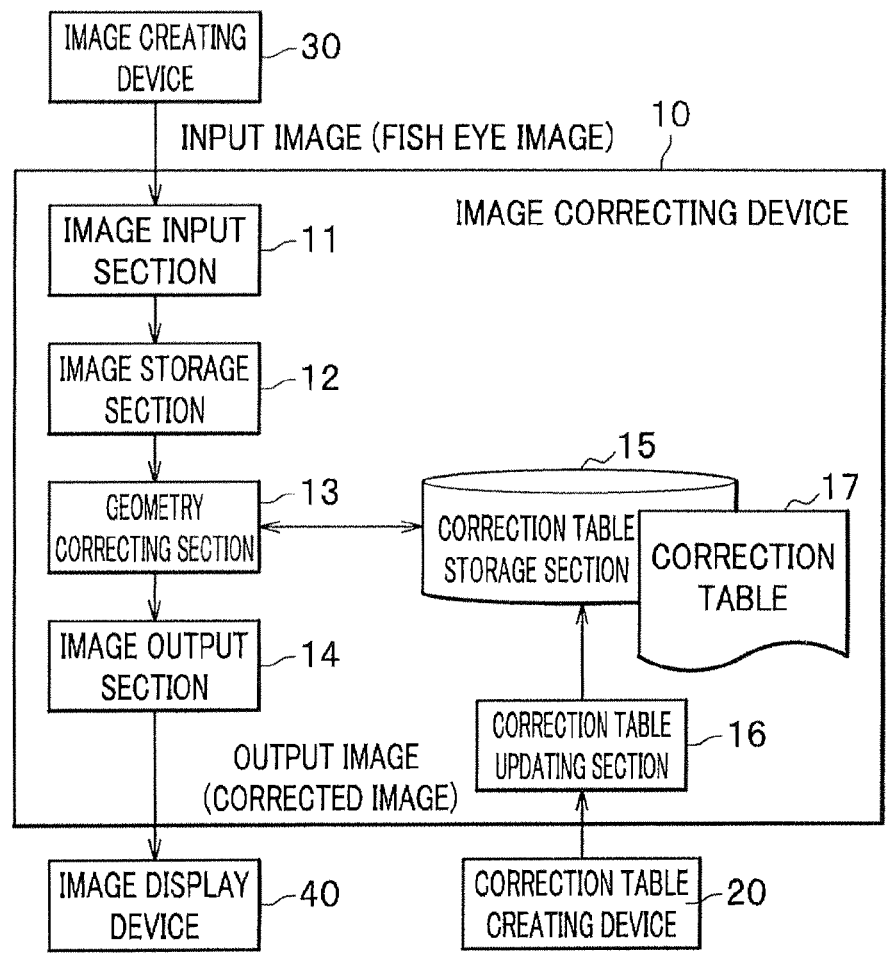
FIG. 1 is a diagram illustrating an example of the configuration of an image correcting device.
FIG. 2 is a diagram schematically showing an example of a correction table.

As shown in FIG. 1, an image correcting device 10 in the present embodiment takes in an input image, such as a fisheye image, corrects the image, and outputs the corrected image as an output image.

An image creating device 30 creates image data and supplies the image data to the image correcting device 10. In the present embodiment, the image creating device 30 will be described, taking an example of a digital video camera having a fisheye lens of an equidistance projection type with a horizontal angle of view of 180 degrees.

An image display device 40 displays the corrected image (output image) corrected by the image correcting device 10.

A correction table creating device 20 in the present embodiment creates a correction table 17 to be stored in a later-described correction table storage section 15 of the image correcting device 10. The correction table creating device 20 is, for example, configured with a personal computer.

The correction table creating device 20 creates the correction table 17, and then transmits this correction table 17 to the image correcting device 10 before a geometry correcting section 13 performs geometry correction processing with the correction table 17.

Incidentally, when it is not necessary to update the correction table 17, in other words, parameters related to creation of the correction table 17 are not changed, the correction table creating device 20 can be separated from the image correcting device 10 after transmitting the created correction table 17.

Configuration of Image Correcting Device 10

As shown in FIG. 1, the image correcting device 10 includes an image input section 11, an image storage section 12, the geometry correcting section 13, an image output section 14, the correction table storage section 15, and a correction table updating section 16.

The image input section 11 reads an input image supplied from the image creating device 30, and writes the input image into the image storage section 12. The pixel values of each pixel of the input image having been read are digitized values for primary colors (three colors of R, G, and B in the present embodiment), one of the 256 integer values from '0' to '255' being applied to each value.

The input image can be read from the image creating device 30, using an interface that matches the configuration of the image creating device 30. For example, in a case where the input image is supplied as analog signals from the image creating device 30, an A/D converter can be employed for the configuration, and in a case where the input image is supplied as digital signals via a USB (Universal Serial Bus) or the like, an interface applicable to them can be employed for the configuration.

The image storage section 12 is provided with a memory (RAM: Random Access Memory) with a capacity that allows storage corresponding to at least two full frames of input images supplied from the image creating device 30. Two independent parts of the capacity of the image storage section 12 are alternately used for two purposes; one is a frame buffer into which the image input section 11 writes one frame of the input images, and the other is a frame buffer from which the geometry correcting section 13 refers pixel values of the previous frame of the input images.

Based on the correction table 17 stored in the later-described correction table storage section 15, the geometry correcting section 13 performs geometry correction on the input image stored in the image storage section 12, and outputs an output image (corrected image) as a result of the geometry correction to the image output section 14. The geometry correcting section 13 is configured, for example, with an FPGA (Field Programmable Gate Array) or an ASIC (Application Specific Integrated Circuit). Incidentally, details of the processing performed by the geometry correcting section 13 will be described later (refer to FIG. 3).

The image output section 14 converts the output image (corrected image), which has been output from the geometry correcting section 13, into appropriate video signals and output the video signals to the image display device 40. For example, when the image display device 40 is configured to display analog video signals, the image output section 14 can be configured with a D/A convertor.

The correction table storage section 15 stores the later-described correction table 17, and can be configured with, for example, a rewritable nonvolatile memory.

The correction table updating section 16 receives a correction table 17 transmitted from the correction table creating device 20 and stores it in the correction table storage section 15. The correction table updating section 16 can be configured, for example, with a USB interface or an IEEE1394 interface that matches the interface on the side of the correction table creating device 20.

In the correction table 17, it is determined which pixels of the input image (fisheye image) stored in the image storage section 12 are to be referred to in determining the pixel values of the respective pixels of the output image (corrected image) which is to be output from the geometry correcting section 13. In the present embodiment, as the correction table 17, a resampling table, concretely, 'a table that associates each pixel of the output image to be output from the geometry correcting section 13 with a pair (x, y), which corresponds to the each pixel, of fixed-point numbers representing two dimensional coordinate values on the input image stored in the image storage section 12' is used. The correction table 17 is created by the later-described (refer to FIGS. 9 and 10) method and the correction table creating device 20, and then stored in the correction table storage section 15 via the correction table updating section 16.

The resampling table (correction table) 17, as shown in FIG. 2 for example, associates the pixel coordinates (u, v) on the output image with the coordinates (x, y) on the input image. FIG. 2 shows an example of a resampling table (correction table) in a case of 640 pixels along u axis and 480 pixels along v axis. Incidentally, u, v are integers, however, x, y are not necessarily integers. In a case where coordinates (x, y) on the input image associated with pixel coordinates (u, v) on the output image are out of the range of the input image, predetermined exception values, for example (−1, −1), are stored in association with the pair of (u, v).

Operation of the Geometry Correcting Section 13 in Image Correcting Device 10

The operation of the geometry correcting section 13 of the image correcting device 10 will be described below, with reference to FIG. 3 (refer to FIG. 1 for configuration, as appropriate).

First, it is assumed that the input image is stored in the image storage section 12, and the correction table 17 is stored in the correction table storage section 15.

Figure 3:
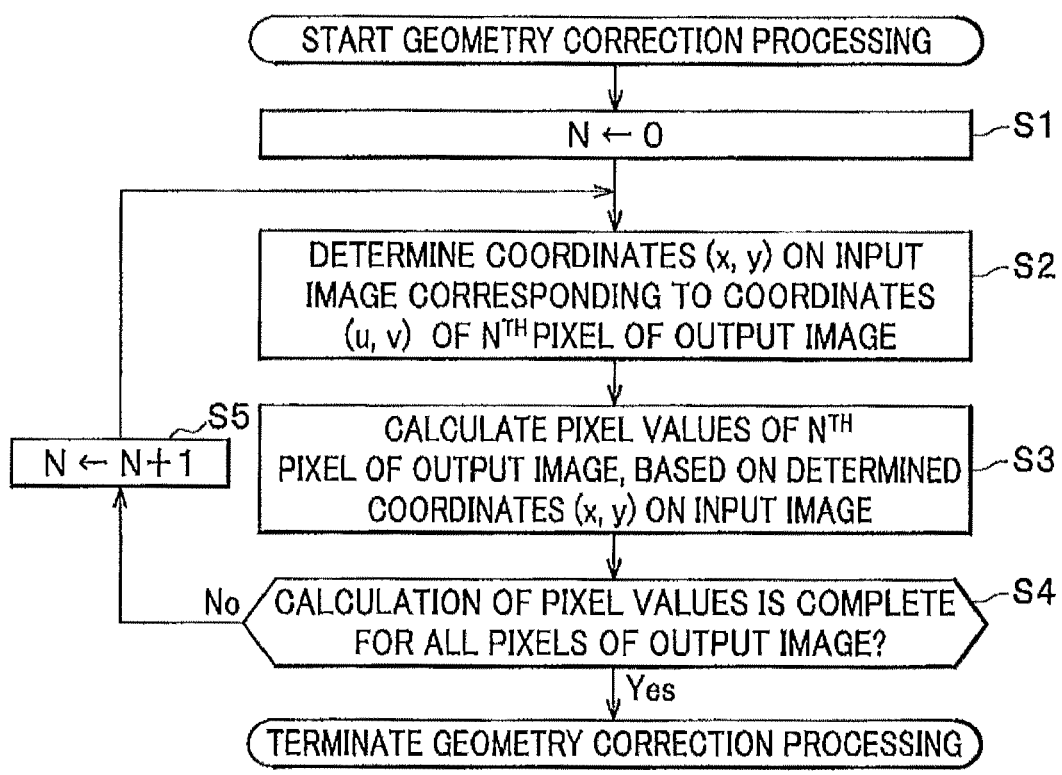
FIG. 3 is a flowchart showing an example of the operation of a geometrical correcting section of the image correcting device.

As shown by the flowchart in FIG. 3, in step S1, the geometry correcting section 13 sets the value of N of a counter to '0'.

In step S2, the geometry correcting section 13 determines coordinates (x, y) on the input image that correspond to the coordinates (u, v) of the $N^{th}$ pixel on the output image. Concretely, first, the geometry correcting section 13 sets the value of v to the quotient of the value of N of the counter divided by the number of pixels along u axis of the output image, and sets the value of u to the remainder (That is, if the number of pixels along u axis is 'B', N=v·B+u), and thus pixel coordinates (u, v) on the output image are calculated. Then, based on the correction table 17, the geometry correcting section 13 determines the coordinates (x, y) on the input image that correspond to the pixel coordinates (u, v) on the output image.

In step S3, based on the determined coordinates (x, y) on the input image, the geometry correcting section 13 calculates the pixel values of the $N^{th}$ pixel of the output image. Concretely, for example, based on the coordinates (x, y) on the input image, the pixel values of the output image can be determined by bilinear interpolation using the pixel values of the four nearest pixels on the input image for the respective primary colors (namely respective RGB colors). Incidentally, another conventional technology, such as bicubic interpolation, may be used to calculate the pixel values of the output image.

Incidentally, when corresponding coordinate values do not exist on the input image, in other words, when coordinates (x, y) on the input image, the coordinates having been determined based on the resampling table 17, are the predetermined exception values, the geometry correcting section 13 sets the pixel values on the output image to 'black', namely (R, G, B)=(0, 0, 0), for example.

In step S4, the geometry correcting section 13 determines whether or not calculation of pixel values has been completed for all the pixels of the output image.

If it is determined that calculation of pixel values have been completed for all the pixels of the output image (step S4, Yes), the geometry correcting section 13 terminates the geometry correction processing.

On the other hand, if it is determined that, among the pixels of the output image, there is a pixel for which calculation of pixel values is not complete yet (step S4, No), then the geometry correcting section 13 adds '1' to the value of N of the counter (step S5). Subsequently, the process returns to step S2 and continues processing.

Determination as to whether or not calculation of pixel values have been completed for all the pixels of the output image can be carried out by comparison between the value of N of the counter and the number of pixels of the output image.

Configuration of Correction Table Creating Device 20

Figure 4:
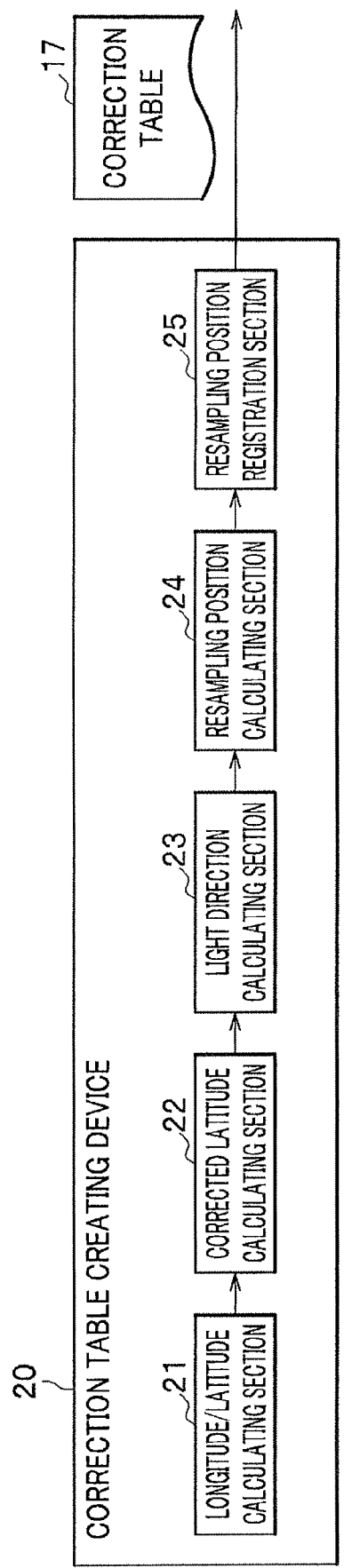
FIG. 4 is a block diagram showing an example of the configuration of a correction table creating device in a first embodiment.

As shown in FIG. 4, the correction table creating device 20 includes a longitude/latitude calculating section 21, a corrected latitude calculating section 22, a light direction calculating section 23, a resampling position calculating section 24, and a resampling position registration section 25.

The longitude/latitude calculating section 21 calculates longitudes λ and latitudes Φ that correspond to pixel coordinates (u, v) on an output image. For example, the longitude/latitude calculating section 21 calculates longitudes λ and latitudes Φ, using Mercator projection, which is one of non-perspective cylindrical projections among map projections used for creation of a world map. In the present embodiment, in order to associate the pixel coordinate at the left end of the output image with a longitude of '−90 degrees (=−π/2)' and associate the pixel coordinate at the right end of the output image with a longitude of '90 degrees (=π/2)', calculation is performed according to following Expression (1), using a constant 'w' for normalization of the scale along u axis. Incidentally, 'ψ=π/2' in Expression (1).

[Expression (1)]

$$\begin{cases} \lambda = \dfrac{u - u_c}{w} \cdot \psi \\ \Phi = 2\tan^{-1}\left\{\exp\left[\dfrac{v - v_c}{w} \cdot \psi\right]\right\} - \dfrac{\pi}{2} \end{cases} \quad \text{Expression (1)}$$

Thus, the u-v coordinate system of the output image, shown in FIG. 5A, is transformed into a longitude/latitude coordinate system, shown in FIG. 5B. Herein, O' ($u_c$, $v_c$) are the coordinates of the center position of the output image. For example, if the number of pixels along u axis of the output image is 640, the value of $u_c$ is calculated as '(0+639)/2' to be '319.5'. The value of $v_c$ can be likewise calculated. Constant w is introduced for the above-described purpose, set equal to the value of $u_c$, and also applied to normalization of the scale along v axis, according to Expression (1), in order to ensure the consistency of the scale over the entire output image. $P_1$ (u, v) is transformed into $P_2$ (λ, Φ).

The corrected latitude calculating section 22 calculates a corrected latitude ϕ, which is a latitude used for calculation of a light direction vector, from an input longitude λ and latitude Φ. For example, the corrected latitude calculating section 22 calculates the corrected latitude ϕ, according to following Expression (2).

[Expression (2)]

$$\begin{cases} \phi = \tan^{-1}\{\tan(\Phi) \cdot f(\lambda)\} \\ f(\lambda) = \alpha + (1-\alpha)\cos\lambda \quad (\alpha = 0.4) \end{cases} \quad \text{Expression (2)}$$

Thus, as shown in FIG. 5B, correction with respect to the latitude direction is performed in the longitude/latitude coordinate system. $P_2$ (λ, Φ) is transformed into $P_3$ (λ, ϕ). Incidentally, the reason for performing such a correction will be described later.

The light direction calculating section 23 calculates a light direction vector (X, Y, Z) from the input longitude λ and the corrected latitude ϕ. The light direction calculating section 23 calculates the light direction vector (X, Y, Z), according to following Expression (3).

[Expression (3)]

$$\begin{cases} X = \sin\lambda \cdot \cos\phi \\ Y = \sin\phi \\ Z = \cos\lambda \cdot \cos\phi \end{cases} \quad \text{Expression (3)}$$

Thus, the longitude/latitude coordinate system, shown in FIG. 5B, is transformed into the XYZ coordinate system, shown in FIG. 6A. The XYZ coordinate system is a coordinate system of the subject space. $P_3$ (λ, ϕ) is transformed into $P_4$ (X, Y, Z). Point O is the center of projection. A light direction vector (X, Y, Z) is a direction vector that is from point O toward the point with the longitude λ, and the latitude Φ and normalized to have a length of '1'.

The resampling position calculating section 24 calculates coordinates (x, y) on the input image from the light direction vector (X, Y, Z) calculated by the light direction calculating section 23, as a resampling position. The resampling position is coordinates (x, y) on the input image, and is the optimum position in resampling, from the input image, the pixel values of a pixel that is present at pixel coordinates (u, v) on the output image. Because the input image in the present embodiment has been captured using a fisheye lens of an equidistance projection type, the resampling position calculating section 24 calculates the coordinates (x, y) on the input image, for example, according to the following Expression (4).

[Expression (4)]

$$\begin{cases} x = x_c + \dfrac{X}{\sqrt{X^2+Y^2}} \cdot \dfrac{2}{\pi} \cdot R \cdot \cos^{-1}(Z) \\ y = y_c + \dfrac{Y}{\sqrt{X^2+Y^2}} \cdot \dfrac{2}{\pi} \cdot R \cdot \cos^{-1}(Z) \end{cases} \quad \text{Expression (4)}$$

Thus, the XYZ coordinate system, shown in FIG. 6A, is transformed into the x-y coordinate system, shown in FIG. 63, of the input image. Herein, O" ($x_c$, $y_c$) are the coordinates of the center of the image circle of the input image. Further, R represents the radius of the image circle and corresponds to the half angle of view of 90 degrees. $P_4$(X, Y, Z) are transformed into $P_5$ (x, y).

Incidentally, it is assumed that $x_c$, $y_c$, and R are registered as design values in advance in the correction table creating device 20. Further, the sorts of camera parameters are not limited thereto, allowing various changes, depending on a projection model to be used, and the parameters may be estimated using a conventional technology from one or plural input images. For example, the coordinates O" ($x_c$, $y_c$) of the center of the image circle and the radius R of the image circle can be estimated from the estimation of the circle by a conventional technology, using the fact that the outer portion of the image circle is, in general, black colored (Extremely small values are stored as the respective pixel values (R, G, B)). Further, instead of Expression (4), correction expression including a higher-order term for correction of distortion in an optical system by a conventional technology may be applied.

The resampling position registration section 25 registers the coordinates (x, y) on the input image calculated by the resampling position calculating section 24 in the correction table 17, associating the coordinates (x, y) with the pixel coordinates (u, v) on the output image. Incidentally, when the coordinates (x, y) on the input image calculated by the resampling position calculating section 24 are out of the range of the input image, exception values determined in advance, (−1, 1) for example, are registered in association with (u, v) as described above.

Herein, the reason for performing correction from the latitude ϕ to the corrected latitude ϕ by the corrected latitude calculating section 22 will be described, with reference to FIGS. 5A, 5B, 6A, 6B, 7, and 8.

Figure 7:
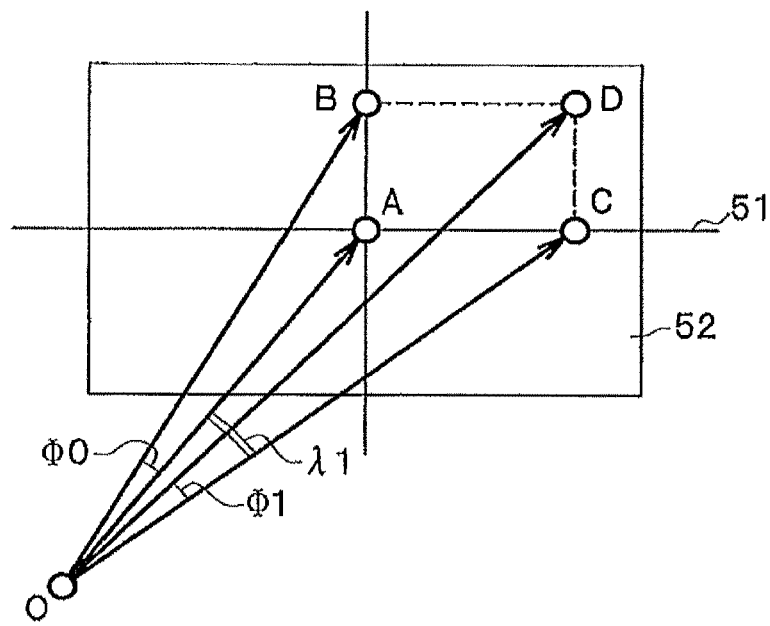
FIG. 7 is a diagram for illustrating an example of a case where a line in a subject space is distorted on an output image and a case where a line in the subject space is not distorted on the output image.

In FIG. 7, point O is the projection center. Point A corresponds to point A, in FIG. 6A, with a longitude of 0 degree and a latitude of 0 degree. Vector OA is the direction of the optical axis of the fisheye lens. Plane 52 is a plane perpendicular to vector OA in the subject space. Line 51 is a line of intersection between plane 52 and XZ plane in FIG. 6A. Rectangle ABDC is on plane 52.

Mercator projection is a projection that projects a spherical surface onto a plane, wherein both a semicircle of equal longitude and a circle of equal latitude on the spherical surface become lines on the plane. Accordingly, line AB, line AC, and line CD shown in FIG. 7 become lines without being distorted when they are projected onto the unit spherical surface in FIG. 6A and further expanded onto the longitude/latitude plane in FIG. 5B. This is because line AB and line CD become semicircles of equal longitude on the unit spherical surface, and line AC becomes a circle of equal latitude of 0 degree on the unit spherical surface. On the other hand, the length of segment OC is '1/cos(λ1)' compared with the length of segment OA, and accordingly, angle Φ0 of ∠AOB, which is the latitude of point B, and angle Φ1 of ∠COD, which is the latitude of point D, are in a relationship of 'tan(Φ1)=tan (Φ0)·cos(λ1)' therebetween. That is, line BD does not become a semicircle of equal latitude on the unit spherical surface, and accordingly, when line BD is represented by Mercator projection, line BD does not become linear but becomes distorted on the plane onto which line BD is projected.

In order to reduce the distortion of line BD in this situation, for example, Expression (2) is used. Herein, if the distortion of line BD were to be completely eliminated, f(λ) would be 'f(λ)=cos(λ)'. However, if this function were applied to f(λ) and when a longitude λ of 90 degrees is input to the corrected latitude calculating section 22, then a corrected latitude ϕ would be '0', independent from the value of an input latitude Φ. This means that the magnifying factor in the vertical direction is extremely larger as a position is closer to the left or right end of the output image, which is not desirable for a user who looks at the output image.

Figure 8:
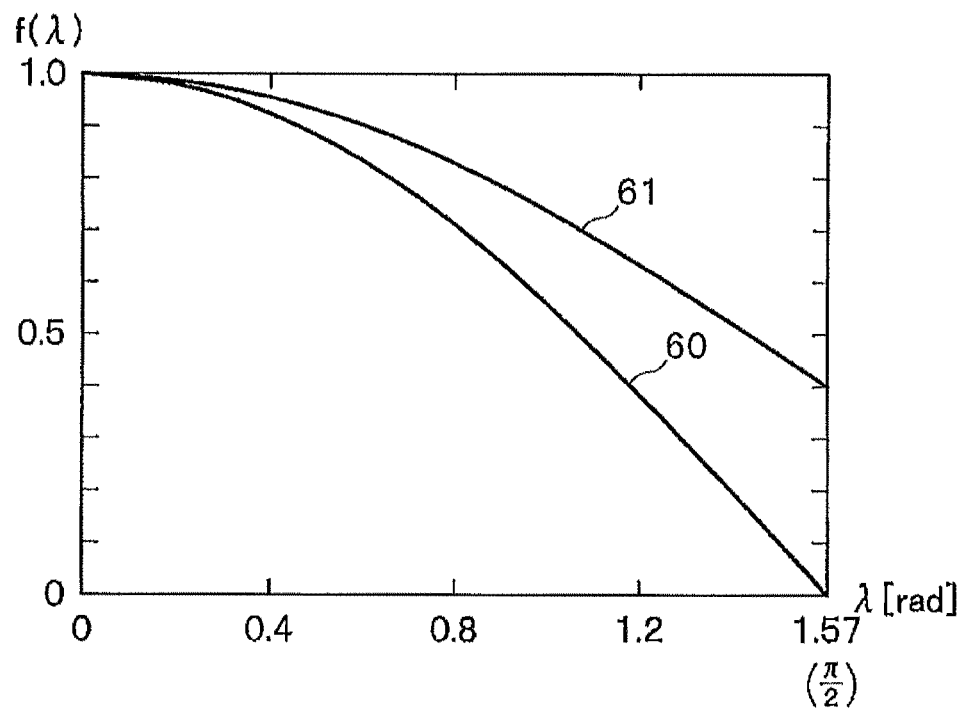
FIG. 8 is a diagram for illustrating an example of functions that a corrected latitude calculation section of the correction table creating device in the first embodiment uses in correcting latitudes.

Therefore, an approximate expression, such as f(λ) in Expression (2), instead of 'f(λ)=cos(λ)' is applied to f(λ). For example, FIG. 8 shows graphs of f(λ) in a range of 0≤λ≤(π/2), wherein curve 60 represents 'cos(λ)', and curve 61 represents f(λ) of Expression (2). Herein, in an area where the absolute value of λ is small, in other words, in the vicinity of the center of the output image, curve 61 is desirably close to curve 60. This is because the distortion of a line is better corrected. On the other hand, as the value of f(λ) is closer to zero, the magnifying factor in the vertical direction is larger. Accordingly, the minimum value of curve 61 is desirably designed to maintain a certain largeness.

More concretely, f(λ) in Expression (2) is designed such as to satisfy the following conditions. The function to be used in correcting a latitude by the corrected latitude calculating section is not limited to the function of Expression (2) as long as the function satisfies these conditions.

The first condition is 'f(λ)≤1'. This condition guarantees prevention of correction toward a wrong direction, over the entire region of the domain of λ.

The second condition is 'a certain Λ exists that satisfies f(Λ)<1', wherein Λ is a value included in the domain of λ. This condition guarantees correction toward a right direction for at least one of λ.

The third condition is 'cos(λ)≤f(λ)'. This condition guarantees prevention of excessive correction, over the entire region of the domain of λ.

The fourth condition is 'f(λ)/cos(λ) monotonously non-decreases'. This is a condition that gradually weakens the degree of latitude correction without fluctuation.

The fifth condition is 'f(λ)≥G for a given constant G in the range 0<G<1'. This is a condition that makes the vertical magnifying factors be in a certain range over the entire region of the output image. The value of G can be determined in advance, based on a permitted vertical magnifying factor or a permitted degree of distortion of a horizontal line. However, it is possible that if the value of G increases, while the maximum vertical magnifying factor can be reduced, the degree of correction against the distortion of the horizontal line is weakened. In reverse, it is also possible that if the value of G decreases, while the degree of correction against the distortion of the horizontal line is strengthened, the maximum vertical magnifying factor increases. Accordingly, a value larger than or equal to 0.2 and smaller than or equal to 0.5 is preferably used.

Operation of Correction Table Creating Device 20

The operation of the correction table creating device 20 will be described below, with reference to FIG. 9 (refer to FIG. 4 for configuration, as appropriate).

Figure 9:
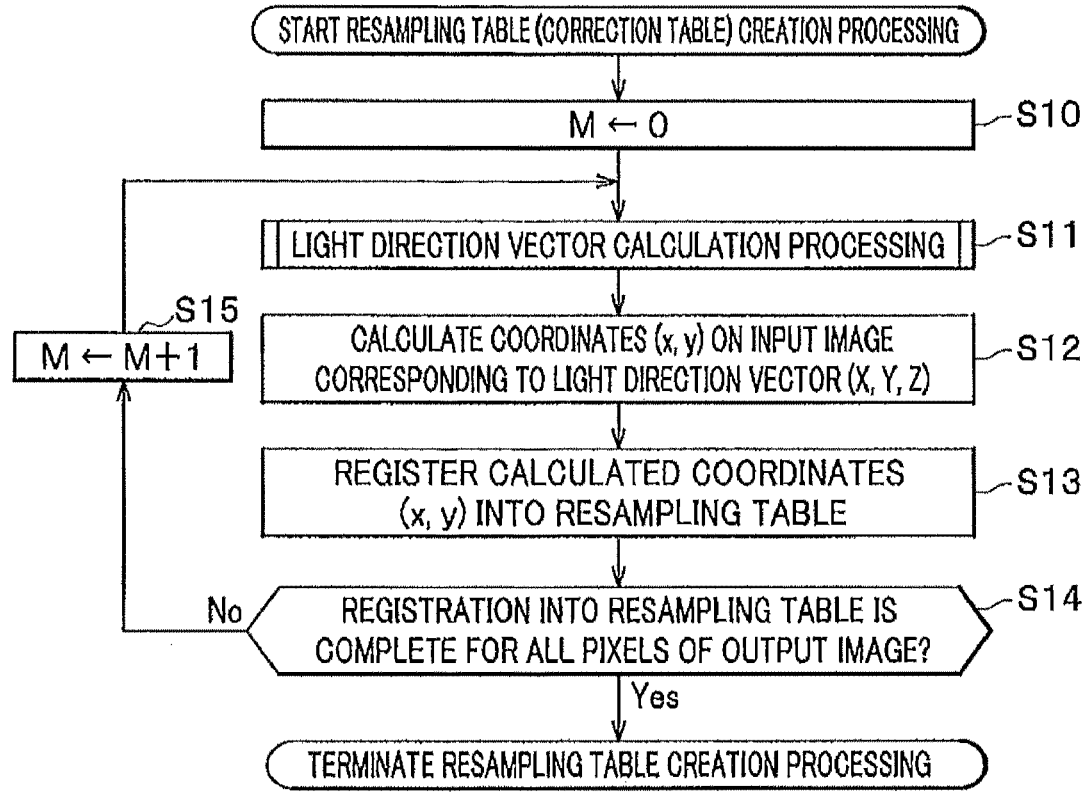
FIG. 9 is a flowchart showing an example of the operation of the correction table creating device in the first embodiment.

As shown by the flowchart in FIG. 9, in step S10, the correction table creating device 20 sets the value M of the counter to '0'.

In step S11, the correction table creating device 20 performs light direction vector calculation processing. This processing will be described later in detail (refer to FIG. 10).

In step S12, the resampling position calculating section 24 calculates coordinates (x, y) on the input image corresponding to the light direction vector (X, Y, Z).

In step S13, the resampling position registration section 25 registers the calculated coordinates (x, y), associating the coordinates (x, y) with the pixel coordinates (u, v) on the output image in a resampling table (correction table) 17.

In step S14, the correction table creating device 20 determines whether or not registration into the resampling table (correction table) 17 has been completed for all the pixels on the output image.

If registration into the resampling table (correction table) 17 has been completed for all the pixels on the output image (step S14, Yes), the correction table creating device 20 terminates the resampling table (correction table) creation processing.

On the other hand, among the pixels of the output image, if there is a pixel for which registration into the resampling table (correction table) 17 is not complete yet (step S14, No), the correction table creating device 20 adds '1' to the value of M of the counter (step S15). Subsequently, the process returns to step S11 and continues the processing.

Incidentally, determination as to whether or not registration into the resampling table (correction table) 17 has been completed for all the pixels of the output image can be carried out by comparison between the value of M of the counter and the number of pixels of the output image.

Light Direction Vector Calculation Processing

The light direction vector calculation processing in step S11 (refer to FIG. 9) will be described below, with reference to FIG. 10.

Figure 10:
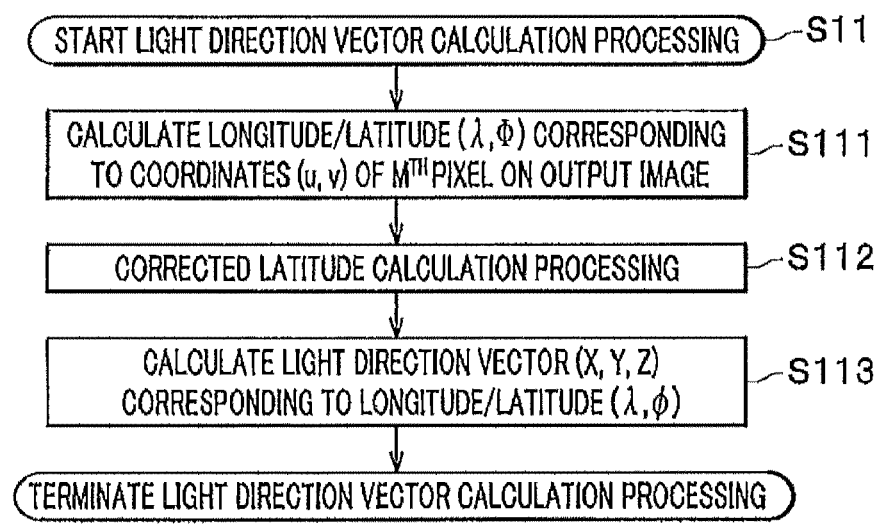
FIG. 10 is a flowchart showing an example of the operation of a longitude/latitude calculating section, a corrected latitude calculating section, and a light direction vector calculating section of the correction table creating device in the first embodiment.

As shown by the flowchart in FIG. 10, in step S111, the longitude/latitude calculating section 21 calculates longitude/latitude (λ, Φ) that correspond to the coordinates (u, v) of the $M^{th}$ pixel of the output image.

In step S112, the corrected latitude calculating section 22 performs corrected latitude calculation processing.

In step S113, the light direction calculating section 23 calculates a light direction vector (X, Y, Z), based on the longitude λ calculated by the longitude/latitude calculating section 21 and the corrected latitude ϕ calculated by the corrected latitude calculating section 22. Subsequently, the light direction vector calculation processing is terminated.

By the above-described operation, while the phenomenon that a horizontal line is rapidly distorted in the vicinity of a specific region is prevented, the degree of distortion of a group of lines to be represented as vertical or horizontal lines on the image after correction is reduced compared with the image before the correction.

Second Embodiment

A second embodiment will be described below, with reference to FIGS. 11 and 12.

Configuration of Correction Table Creating Device 20A

Figure 11:
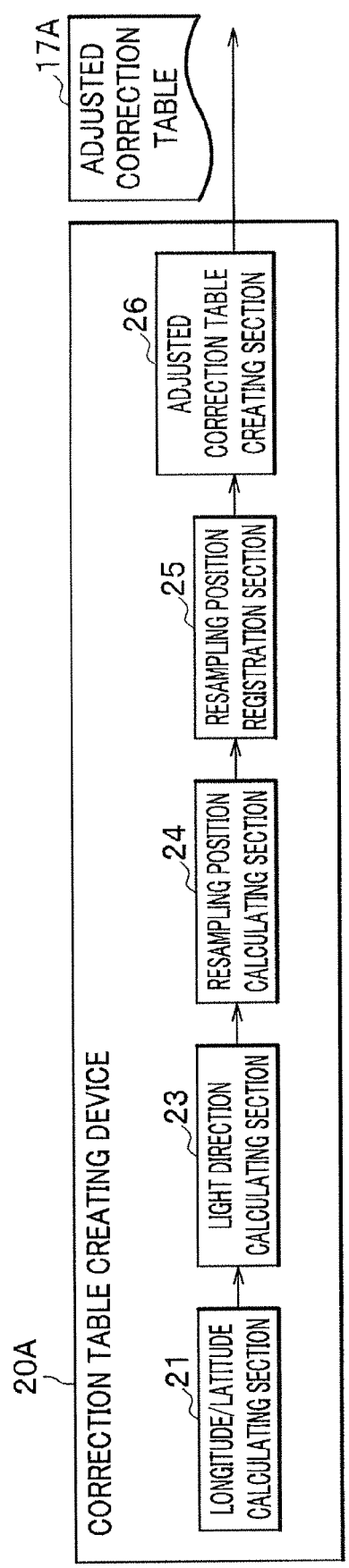
FIG. 11 is a block diagram showing an example of the configuration of a correction table creating device in a second embodiment.

As shown in FIG. 11, a correction table creating device 20A does not include a corrected latitude calculating section 22 but includes an adjusted correctionSable creating section 26, compared with the correction table creating device 20 in the first embodiment. Incidentally, the same symbols are assigned to the same parts as those in the first embodiment, and overlapped description will be omitted.

Instead of calculating corrected latitudes similarly to the first embodiment in creating a resampling table (correction table) (not shown), the correction table creating device 20A creates a resampling table (correction table) (not shown) without correcting latitudes and then creates an adjusted resampling table (adjusted correction-table) 17A by adjusting the values in the resampling table (correction table). Thus, advantages similar to those in the first embodiment can be obtained.

The adjusted correction-table creating section 26 directly corrects the resampling table (correction table) in a two two-dimensional coordinate system. The adjusted resampling table (adjusted correction-table) 17A having been corrected is transmitted to the image correcting device 10. Details will be described by the following flow. Incidentally, the size of the adjusted resampling table 17A is the same as that of the resampling table 17 in the first embodiment, and the coordinate system applied to the table is also the same.

Operation of Correction Table Creating Device 20A

The operation of the correction table creating device 20A will be described below, with reference to FIG. 12 (refer to FIG. 11 for configuration, as appropriate).

Figure 12:
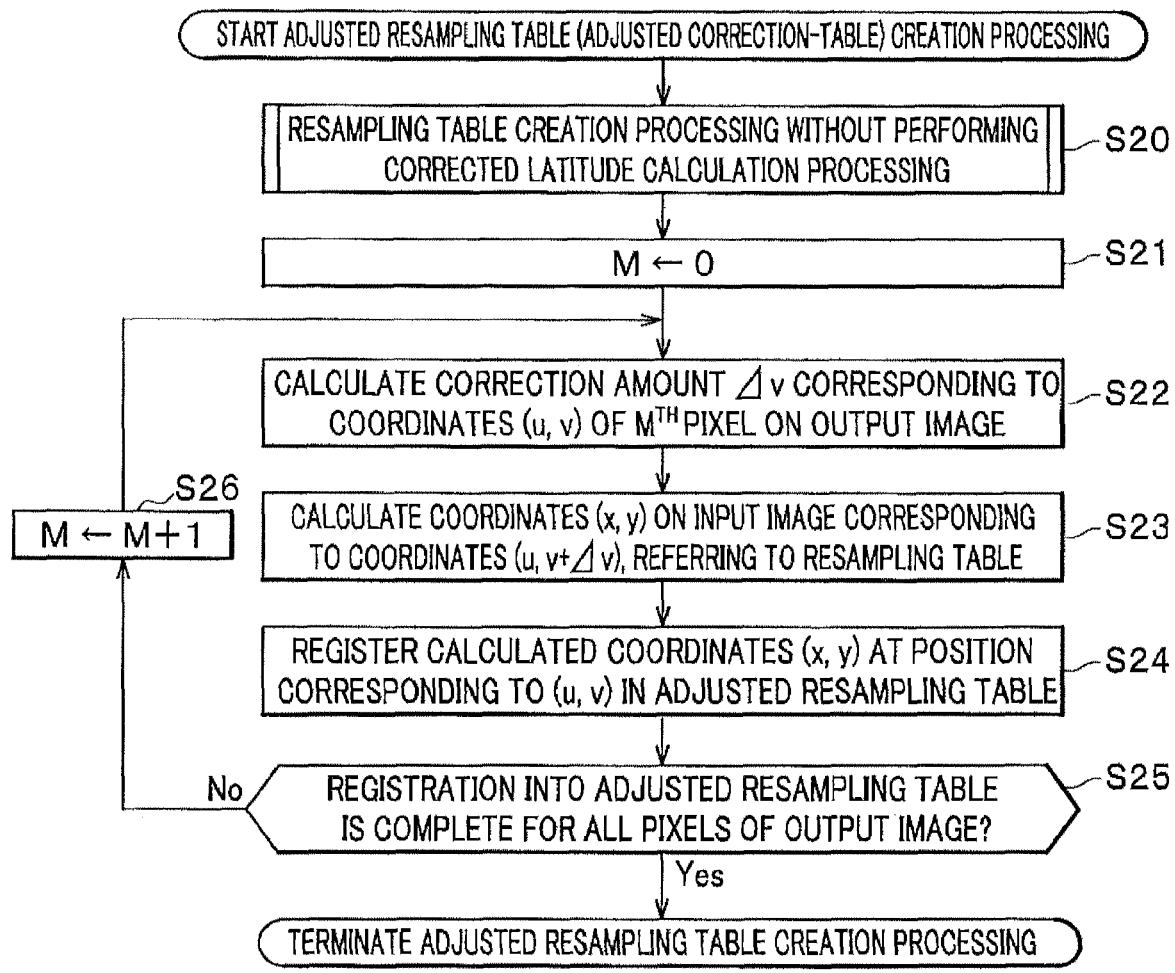
FIG. 12 is a flowchart showing an example of the operation of the correction table creating device in the second embodiment.

As shown in the flowchart in FIG. 12, in step S20, the correction table creating device 20A performs resampling table creation processing without corrected latitude calculation processing. That is, the processing having been described with reference to FIGS. 9 and 10 is performed, excluding step S112 (corrected latitude calculation processing). Latitudes Φ before correction are used for corrected latitudes φ in Expression (3).

Figure 13A:
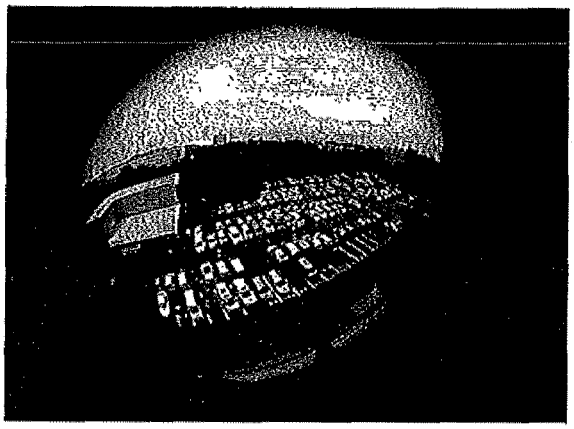
FIG. 13A is a diagram showing an example of a fisheye image (input image)
Figure 13B:
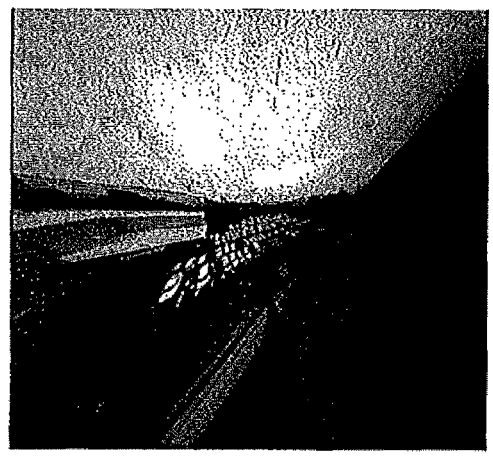
FIG. 13B is a diagram showing an example of a corrected image (output image) as a result of correcting the fisheye image (input image) in FIG. 13A, applying perspective transformation, which is a conventional technology.
Figure 13C:
FIG. 13C is a diagram showing an example of a corrected image (output image) as a result of correcting the fisheye image (input image) in FIG. 13A, applying a Mercator projection as it is, which is a conventional technology.
Figure 14:
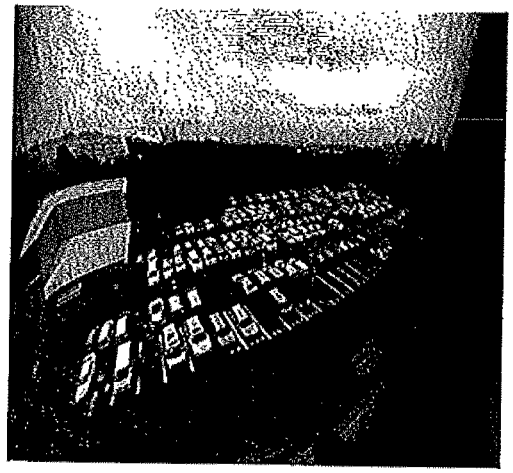
FIG. 14 shows an example of a corrected image (output image) as a result of applying an embodiment to the fisheye image (input image) in FIG. 13A.

Incidentally, if a resampling table (correction table) created in such a manner is stored in the correction table storage section 15 of the image correcting device 10, and the geometry correcting section 13 performs geometrical correction processing, it results in that a horizontal line in a subject space is significantly distorted on an output image (refer to FIG. 13C). The degree of distortion is larger as the absolute value of 'u−uc' is larger, and larger as the absolute value of 'v−vc' is larger. In order to reduce the degree of distortion, the following processing is performed.

In step S21, the correction table creating device 20A sets the value of M of a counter to '0'.

In step S22, the adjusted correction-table creating section 26 calculates a correction amount Δ(v that corresponds to the coordinates (u, v) of the $M^{th}$ pixel of the output image. It is aimed at improving the phenomenon that a horizontal line in the subject space becomes closer to the line of 'v=vc' as the u coordinate is more distant from uc. Accordingly, the absolute value of Δv is set to be larger as the absolute value of 'u−uc' is larger, and to be larger as the absolute value of 'v−vc' is larger, wherein, regarding the plus or minus sign of Δv, minus sign is assigned if 'v−vc' has a positive value, and plus sign is assigned if '$v-v_c$' has a negative value. Concretely, for example, Δv is calculated, using following Expression (5). The range of value applicable to β is '0<β<1', however, in the present embodiment, 'β=0.44' is selected due to the trade-off between the degree of correction against the distortion of horizontal lines and the vertical magnifying factors.

[Expression (5)]

$$\Delta v = -\beta \cdot \left(\frac{u-u_c}{w}\right)^2 \cdot (v-v_c) \ (\beta = 0.44) \quad \text{Expression (5)}$$

In step S23, the adjusted correction-table creating section 26 calculates coordinates (x, y) on the input image that correspond to coordinates (u, v+Δv), referring to the resampling table (correction table) created in step S20. Herein, v+Δv is not necessarily an integer, while u is an integer, however, calculation can be performed using a conventional interpolation method, such as linear interpolation, with respect to the v coordinate. For example, with an integer v1 obtained by rounding up v+Δv and an integer v2 obtained by rounding down v+Δv, linear interpolation can be performed respectively for x and y, referring to the values of (x, y) that correspond respectively to (u, v1), (u, v2) in the resampling table (correction table).

In step S24, the adjusted correction-table creating section 26 registers the coordinates (x, y) on the input image calculated in step S23, the coordinates (x, y) corresponding to the coordinates (u, v+Δv), at a position in the adjusted resampling table (adjusted correction-table), the position corresponding to the pixel coordinates (u, v) on the output image.

Step S25 and step S26 are similar to step S14 and step S15 in FIG. 9, and description of them will be omitted.

By the above-described operation, instead of performing latitude correction before calculating light direction vectors, also by adjusting a resampling table that has been created by a technology without performing latitude correction, it is possible to obtain the similar advantages as those in a case of performing latitude correction before calculating light direction vectors.

MODIFIED EXAMPLE

Embodiments have been described above, however, without being limited thereto, the following modifications, for example, may be made without departing the spirit of the present invention.

For example, the image creating device 30 is not limited to the examples described above, and various modifications and changes can be made, for example, employing a digital camera having a wide-angle lens, a digital camera having a fisheye lens designed with one of various projection methods including equidistance projection, a video camera having a wide-angle lens or a fisheye lens, or a video reproducing device for reproducing video images captured by these devices and stored in a storage medium. When the projection method of an input image is changed, Expression (4) can be modified to expression suitable for the projection method of an input image, and such a change is easy.

Further, the device to be coupled with the image output section 14 is not limited to the image display device 40, and various modifications and changes can be made, depending on the usage purpose, for example, by coupling a storage device for storage of corrected images or a transfer device for transferring corrected images to another system.

Still further, in the method of calculating pixel coordinates (u, v) from the value of N of the counter, although calculation has been made such as to set the value of v to the quotient of the value of N divided by the number of pixels along u axis of the output image and set the value of u to the remainder in order that the pixels are referred to in the order of raster scan, the order of referring to the pixels of the output image is not limited thereto.

Yet further, the correction table 17 is not limited to a resampling table. For example, in a case where the image correcting device 10 is configured to perform correction such that the geometry correcting section 13 performs correction while calculating coordinates (x, y) on the input image that correspond to pixel coordinates (u, v) on the output image each time, parameters related to the input image and parameters related to the output image can be stored in the correction table storage section 15 as the correction table 17. In this case, the storage capacity of the correction table storage section 15 may be smaller compared with a case of using a resampling table as the correction table 17.

In a case of such arrangement, as a method of obtaining coordinates on the input image that correspond to pixel coordinates on the output image, the geometry correcting section 13 may be configured to execute the flows shown in FIGS. 9 and 10 as they are (However, it is not necessary to register calculated coordinates (x, y) into the resampling table (step S13), and pixel values of the output image can be instantly determined, based on the calculated coordinates (x, y).), or, the geometry correcting section 13 may be configured to use a composite function, which is prepared in advance, such as to be able to directly calculate coordinates (x, y) on the input image that correspond to pixel coordinates (u, v) on the output image from the coordinates (u, v). Further, the correction table updating section 16 may be configured to include a data input device, such as a keyboard, to enable a user to change parameters related to the output image.

Further, the foregoing embodiments have been described taking an example where the vertical and horizontal directions of the fisheye image and the vertical and horizontal directions of the output image agree with each other, however, embodiments according to the present invention are not limited thereto. For example, in a case of using a fisheye camera provided with a three-axis acceleration sensor, a resampling table may be created such that the gravity direction agrees with the vertical direction of an output image, based on the information on the gravity direction in a subject space obtained by this camera. Concretely, it is only necessary to rotate the direction of a coordinate system by a conventional technology in associating a fisheye image with the surface of the ground, and such a change can be made easily.

Further, although, in the description of the foregoing embodiments, calculation of longitudes and latitudes has been performed, using Mercator projection, which is one of non-perspective cylindrical projections, however, embodiments are not limited thereto, and depending on the desired usage, cylindrical projection other than Mercator projection, particularly non-perspective cylindrical projection, such as Miller cylindrical projection, may be used. By the disclosed method, because the correction amounts of latitudes in the vicinity of the longitude of zero degree are small, it is possible in the area to enjoy the features of the non-perspective cylindrical projection used for calculation of longitudes and latitudes. Incidentally, an applicable non-perspective cylindrical projection is not limited in particular to uniquely named projection, and, various projections are applicable, for example, projection by calculation of pairs ($\lambda$, $\Phi$) of longitude and latitude, such as in Expression (6), using a given constant '$\kappa$'.

[Expression (6)]

$$\begin{cases} \lambda = \frac{u - u_c}{w} \cdot \psi \\ \Phi = \frac{1}{\kappa} \cdot \left[ 2\tan^{-1}\left\{ \exp\left( \kappa \cdot \frac{v - v_c}{w} \cdot \psi \right) \right\} - \frac{\pi}{2} \right] \end{cases} \quad \text{Expression (6)}$$

Still further, after executing step S111 and before executing the corrected latitude calculation processing (step S112), processing for correction of longitude may be performed so that the density of longitudes in the vicinity of the center of the output image becomes higher than in the marginal portions. That is, after calculating a pair ($\lambda$, $\Phi$) of longitude and latitude, the longitude is corrected to $\lambda'$ so that the density of longitudes in the vicinity of the center of the output image becomes higher than that in the marginal portion; corrected latitude calculation processing is performed on the pair of the corrected longitude and the latitude ($\lambda'$, $\Phi$) to calculate a pair of corrected longitude and corrected latitude ($\lambda'$, $\phi$); and then a light direction vector (X, Y, Z) is calculated from ($\lambda'$, $\phi$). Thus, the degree of distortion can be dispersed over the entire image region.

Yet further, the range of longitude represented by an output image is not limited to a range of −90 degrees to 90 degrees. In order to change the range of longitude represented by an output image, the value of $\psi$ can be changed to a desired value in Expression (1).

Still further, although the pixel values of each pixel of the input image having been read by the image input section 11 have been set to digitized values, each of which being one of the 256 (That is, the color depth is 8 bits per pixel.) integers from '0' to '255' for the respective primary colors (R, G, B), embodiments are not limited thereto. For example, a change may be made such as to increase the gradations represented by the respective primary colors to 1024 gradations (That is, the color depth is 10 bits per pixel.) ranging from '0' to '1023'. Even when this change causes a difference between the gradations that can be represented by the input image and the gradations that can be represented by the output image, the difference can be easily coped with by a conventional technology. Further, application to multi-primary colors, such as using five colors of (R, G, B, C (cyan), Y (yellow)) as primary colors, can be easily performed, using a conventional technology.

Yet further, the correction table storage section 15 may be configured, using a storage medium attachable/detachable to/from the image correcting device 10, such as an SD memory card. In this case, with an arrangement such that the correction table creating device 20 has an SD memory card writer or the like, and the resampling table (correction table) 17 created by the correction table creating device 20 is registered via the SD memory card writer into the correction table storage section 15, it is not necessary for the image correcting device 10 to include the correction table updating section 16, and such an arrangement is suitable for a case where the resampling table (correction table) 17 is not frequently updated.

The specification and drawings are, accordingly, to be regarded in an illustrative rather than a restrictive sense. It will, however, be evident that various modifications and changes may be made thereto without departing from the spirit and scope of the invention(s) as set forth in the claims.

What is claimed is:

1. An image correcting device for creating a corrected image through geometrical correction of an input image, comprising:

an image input section configured to input the input image;

an image storage section comprising a memory and configured to store the input image;

a geometrical correcting section comprising a circuit and configured to geometrically correct the input image stored in the image storage section by calculating longitudes $\lambda$ and latitudes $\Phi$ that correspond to respective pixel positions on an output image as the corrected image based on cylindrical projection for map projection; by calculating corrected latitudes $\phi$, based on a function f($\lambda$) and the latitudes $\Phi$; by calculating light directions in a subject space, based on the longitudes $\lambda$ and the corrected latitudes $\phi$; by calculating positions on the input image as resampling positions, based on the light directions; and by associating the resampling positions with the pixel positions on the output image; and an image output section configured to output the input image corrected by the geometrical correction section, as the corrected image, wherein the corrected latitudes $\phi$ are calculated according to $\phi = \tan^{-1}\{\tan(\Phi) \cdot f(\lambda)\}$, and wherein in a region where an absolute value of the longitude $\lambda$ is larger than or equal to zero and smaller than or equal to $\pi/2$, the region being within a domain of the longitudes $\lambda$ used for correction, the function f($\lambda$) satisfies cos ($\lambda$)≤f($\lambda$)≤1.

2. An image correcting device according to claim 1, wherein, the longitudes λ and the latitudes Φ are calculated based on Mercator projection for map projection.

3. An image correcting device according to claim 1, wherein the function f(λ) satisfies $f(\lambda) = \alpha + (1-\alpha)\cos(\lambda), 0 < \alpha < 1.$ 4. A method for creating a corrected image through geometrical correction of an input image, comprising the steps of:
inputting the input image;
storing the input image;
geometrically correcting the input image stored by the step of storing the input image, by calculating longitudes λ and latitudes Φ that correspond to respective pixel positions on an output image as the corrected image based on cylindrical projection for map projection; calculating corrected latitudes φ, based on a function f(λ) and the latitudes Φ; calculating light directions in a subject space, based on the longitudes λ and the corrected latitudes φ; calculating positions on the input image as resampling positions based on the light directions; and associating the resampling positions with the pixel positions on the output image; and
outputting the input image corrected by the step of geometrically correcting, as the corrected image, wherein the corrected latitudes φ are calculated according to $\phi = \tan^{-1}\{\tan(\Phi) \cdot f(\lambda)\}$, and wherein in a region where an absolute value of the longitude λ is larger than or equal to zero and smaller than or equal to π/2, the region being within a domain of the longitudes λ used for correction, the function f(λ) satisfies $\cos(\lambda) \leq f(\lambda) \leq 1$.

5. A non-transitory computer-readable medium, comprising a computer program for creating a corrected image by executing the method according to claim 4.

6. A method for creating a corrected image according to claim 4,
wherein, the longitudes λ, and the latitudes Φ are calculated based on Mercator projection for map projection.

7. A method for creating a corrected image according to claim 4,
wherein the function f(λ) satisfies $f(\lambda) = \alpha + (1-\alpha)\cos(\lambda), 0 < \alpha < 1.$

* * * * *